Nov. 1, 1966     R. A. NEWTON ETAL     3,283,296
APPARATUS FOR NORMALIZING A SEISMOGRAM DATA TRACE
Filed May 6, 1964

*INVENTORS.*
ROBERT A. NEWTON,
JIMMIE RAY HUGHES,
JOHN D. BALL,
BY John B. Davidson
ATTORNEY United States Patent Office 3,283,296
Patented Nov. 1, 1966

3,283,296
APPARATUS FOR NORMALIZING A SEISMOGRAM DATA TRACE
Robert A. Newton, Jimmie R. Hughes, and John D. Ball, all of Houston, Tex., assignors, by mesne assignments, to Esso Production Research Company, Houston, Tex., a corporation of Delaware
Filed May 6, 1964, Ser. No. 365,310
4 Claims. (Cl. 340—15.5)

This invention relates to geophysical prospecting utilizing the seismic technique, and more particularly to a technique for eliminating or reducing the effects of variable seismic impulse parameters and variable seismic wave detecting parameters on the traces of a seismogram.

The general method of geophysical exploration utilizing seismic waves comprises the steps of initiating a seismic impulse at or near the surface of the earth, and recording signals generated by geophones as a result of the earth's movements at one or more points more or less spaced from the point of origin of the impulse. The recordation must permit measurement of the time elapsing between the instant of the origination of the impulse and the generation of signals as the result of the subsequent earth movement. The original impulse will set up seismic waves that are transmitted through the earth. Any discontinuity or variation of structure within the earth will reflect and/or refract a portion of the energy in the waves so that a recording of the signals from the receiving points will comprise a number of arriving waves, each derived from the original impulse and each depending from the others in time of arrival, magnitude, and wave shape, or all three.

As the result of variations in seismic wave impulse parameters and variations in detecting and recording parameters (these may be lumped or near surface effects), the data traces resulting from generation and detection of seismic waves as set forth above will vary both in amplitude and phase, with changes from one impulse point to another, and with changes from one detecting location to another. Adjacent traces may vary considerably even though the same information concerning the geologic column traversed by seismic waves is contained therein. It is desirable to "normalize" each trace; i.e., to remove therefrom the effects of variable seismic wave impulse parameters and of variable detecting and recording parameters.

The variable seismic impulse parameters referred to above are concerned with the size of the dynamite charge used to produce the seismic impulse and the effectiveness of the coupling between the energy source and the earth. The variable detecting parameters have to do with variations in geophone construction, effectiveness of the coupling between the earth and the geophone, and the like.

In the past it has been customary to apply automatic gain control in the recordation of data traces produced from electrical signals resulting from detection of seismic waves. While the use of automatic gain control on playback of reproducible seismograms will eliminate undesired amplitude variations in the data traces, it will result in the loss from the data traces of amplitude information related to the geologic column.

Objects and features of the invention not apparent from the above discussion will become evident upon consideration of the following detailed description of the invention taken in connection with the accompanying drawing, wherein.

Figure 1:
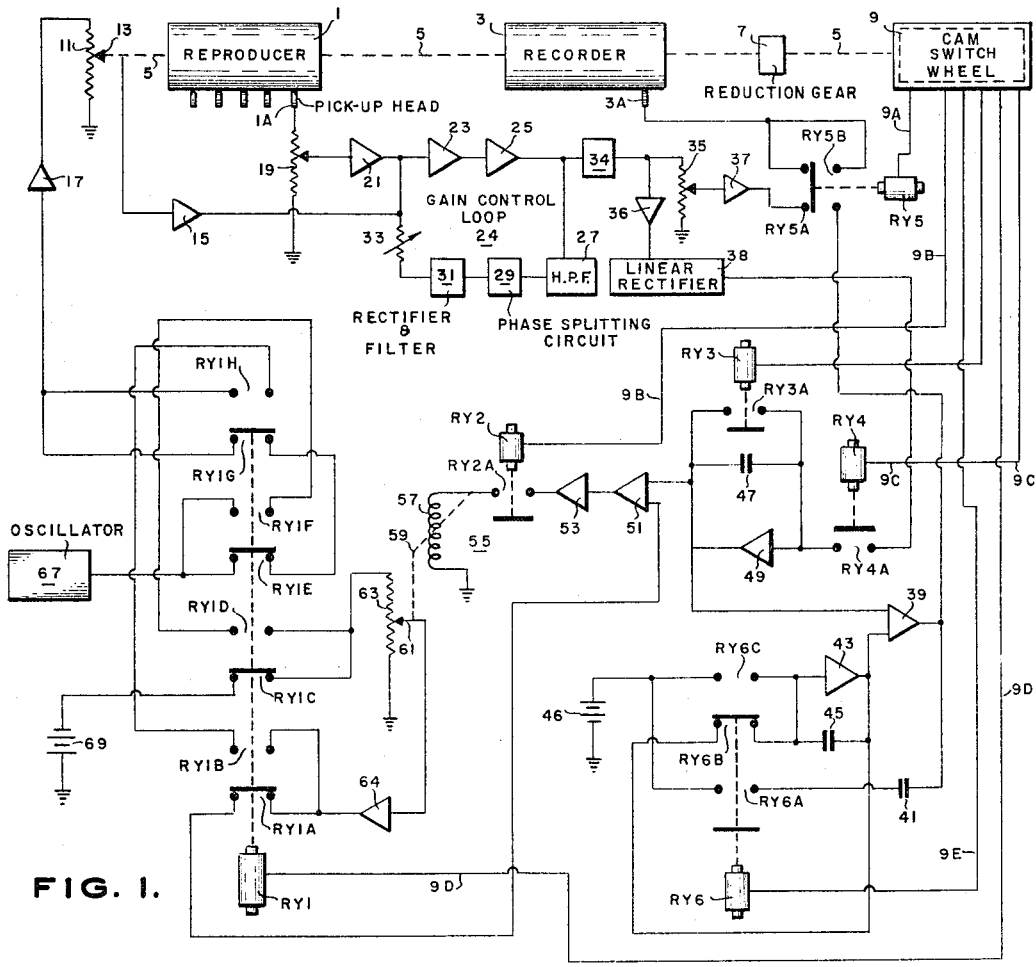
FIG. 1 is a schematic electrical diagram of data trace processing apparatus in accordance with the invention.

With reference now to FIG. 1, there is illustrated a seismogram reproducing apparatus 1 connected by a common shaft 5 to the variable tap 13 of a potentiometer 11, to a recorder 3 for recording electrical signals as data traces, and to a cam switch wheel 9 through a reduction gearing apparatus 7. The data trace reproducer 1 may be any of a number of commercially available apparatuses for reproducing one or more data traces of a seismogram as one or more corresponding electrical signals. Preferably, data trace reproducer 1 is of the type making use of a magnetic tape secured to a drum transport mechanism driven by an electrical motor integral therewith. In FIG. 1 there is illustrated a pickup head 1A for detecting the data trace previously recorded on the recording medium (e.g., a magnetic tape). Manifestly, the reproducing apparatus may have more than one pickup head and may be utilized in accordance with usual practice. The data trace reproducer 1 must be adapted to reproduce the data trace through first and second consecutive reproduction cycles without destroying the quality of the trace. By "reproduction cycle" is meant one complete reproduction of a previously recorded seismic signal (e.g., the output signal of a geophone). Recorder 3 likewise may be any of a number of commercially available apparatuses for recording electrical signals as data traces. The recording may either be on magnetic tape or on a visual recording medium. If a visual recording medium is used, the recordation may be in the form of a wiggly trace, a variable density trace, a variable area trace, or any other form well known to the art. The recorder 3 is provided with a recording head 3A corresponding to the reproducing head 1A. If such is convenient, the shaft 5 interconnecting the reproducer 1 and the recorder 3 may be dispensed with, and the tape or other recording means for reproducer 1 may be mounted on the same drum as the tape or other recording means for the recorder 3. This is in accordance with usual practice and will not be further discussed herein.

Interconnecting the reproducing head 1A and the recording head 3A is an amplifying channel including a variable gain amplifier means for amplifying the electrical signal produced by recording head 3A. As illustrated, the variable gain amplifier comprises a preamplifier 21, first and second series-connected amplifiers 23 and 25, a notch filter 34, and a phase-reversing amplifier 37. The input of preamplifier 21 is connected to reproducing head 1A through a potentiometer 19, the tap of the potentiometer being connected to the input circuit of the amplifier 21. The amplifiers 23 and 25 comprise two components of a gain control loop 24 which also includes a high pass filter 27, a phase splitting circuit 29, a rectifier and filter 31, and a variable resistance element 33 for introducing an adjustable amount of attenuation into the loop. Fixed frequency oscillator 67, which may produce an electrical signal in the range of 3 kilocycles, is coupled to the input of amplifier 23 through preamplifiers 17 and 15, the potentiometer 11, and various contacts of relay RY1 as described below. The output of amplifier 17 is connected across potentiometer 11 and the input circuit of amplifier 15 is connected to the tap 13 of the potentiometer. The control output signal from oscillator 67 is injected into the gain control loop 24, and at the input of amplifier 23, is mixed with the seismic signal from preamplifier 21 so that the output of amplifier 25 comprises a carrier signal of the frequency of oscillator 67 modulated by the low frequency seismic signal from preamplifier 21. The low frequency component of the signal is eliminated by high pass filter 27. The phase splitting circuit 29 and the rectifier and filter 31 produce a D.C. signal, the magnitude of which is controlled by the amplitude of the output signal from amplifier 15. This, in turn, is controlled by the position of tap 13 which is varied through a reproduction cycle of the reproducer 1 in accordance with a predetermined program. Thus, compensation may be made for a programmed gain control apparatus such as is frequently used in the seismic art. Apparatus of the nature described above is illustrated in U.S. Patent No. 2,838,742, McManis, and will not be further described herein.

The output signal of amplifier 25 is applied to notch filter 34 which eliminates the component thereof having the frequency of oscillator 67. The output of the notch filter 34 is applied to recording head 3A through potentiometer 35, amplifier 37, and contact RY5A of relay RY5. In addition, the notch filter output signal is applied to a linear rectifier 38 through an amplifier 36. The function of the linear rectifier is to produce a full wave rectified output signal for application to integrating amplifier 49 whereby a signal is derived indicative of the time integral of the absolute amplitude of the output signal from the variable gain amplifier. The output signal from rectifier 38 is connected to the input of integrating amplifier 49 through the normally-open contact RY4A of relay RY4. The integrating amplifier 49 includes the usual integrating capacitor 47 which is connected to normally-open contact RY3A of relay RY3 so as to be discharged thereby when the contact is closed.

The output signal from integrating amplifier 49 is applied to one of the input circuits of a difference amplifier 51 having at least two input circuits and an output circuit. The other input circuit of difference amplifier 51 is connected to the variable tap 61 of potentiometer 63 through an amplifier 64 and the normally-closed contact RY1A of relay RY1. The signal for application to the second input circuit of amplifier 51 is derived either from oscillator 67 through normally-open contacts RY1F and RY1D, or from a constant potential source 69 (e.g., a battery) through normally-closed contact RY1C. Oscillator 67 is connected across potentiometer 63 through contacts RY1F and RY1D. Battery 69 is connected across potentiometer 63 through contact RY1C. The position of tap 61 on potentiometer 63 varies in accordance with the output signal of the difference amplifier 51. The output signal of the amplifier drives a servo mechanism which, as illustrated, comprises a meter potentiometer 55. The meter potentiometer includes an actuating winding 57 for varying the position of tap 61 through a mechanical linkage 59 in accordance with the current flowing through the winding. The actuating winding 57 of the meter potentiometer 55 is coupled to the output of amplifier 51 through a current amplifier 53 and the normally-open contact RY2A of relay RY2. The meter potentiometer may be of the type manufactured by Computer Instrument Company, of Hempstead, New York, and designated as Model CP.

The output circuit of integrating amplifier 49 also is connected to one of the two input circuits of a circuit means 39, which may be a bistable multivibrator, for producing an output pulse when the signals fed to the two input circuits thereof are of predetermined differential amplitude. The other input circuit of circuit means 39 is connected to the output of an integrating amplifier 43 which includes the customary integrating capacitor 45. Integrating amplifier 43 is connected to a battery 46 or other source of constant potential through normally-open contact RY6C of relay RY6 so as to produce an output signal indicative of the time integral of the potential produced by battery 46. The capacitor 45 is shunted by normally-closed contact RY6B. Battery 46 also is coupled to recording head 3A through series connected, normally-open contact RY6A, capacitor 41, and normally-open contact RY5B so as to produce a pulse for recordation by recording head 3A upon closure of contact RY6A (it being assumed that contact RY5B previously has been closed).

Figure 2:
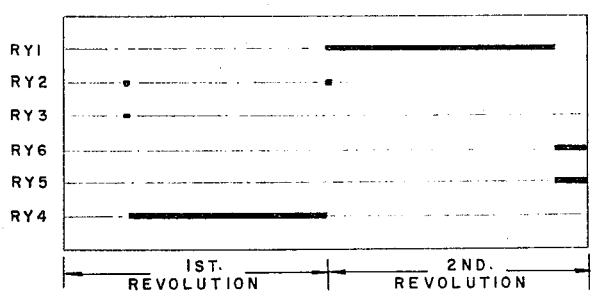
FIG. 2 is a diagram illustrating the relative times of actuation of the various relays illustrated in FIG. 1.

The sequence of operation of relays RY1, RY2, RY3, and RY4 is controlled by a number of cam operated switches in the cam switch wheel 9, which switches are coupled to the respective actuating windings of the relays through lines 9A, 9B, 9C, and 9D. The cam wheel 9 is driven by the same motor that drives the reproducer 1 and recorder 3 through a speed reducing mechanism 7 such that one complete operating sequence of the various relays requires two complete reproduction cycles of the data trace reproducer 1. In other words, one operating sequence of the cam switch wheel requires two complete revolutions of the data trace reproducer 1 and the recorder 3. The sequence of operation of the various relays as determined by the cam switch wheel 9 is illustrated in FIG. 2. As shown, the relay RY4 is actuated over the first alternate reproduction cycles of the reproducer 1 to close contact RY4A. Relay RY2 is momentarily actuated at the beginning of each reproduction cycle to close contact RY2A. Relay RY3 is momentarily actuated only at the beginning of alternate first reproduction cycles to close contact RY3A. Relay RY1 is actuated over substantially the entirety of second alternate reproduction cycles to close contacts RY1B, RY1D, RY1F, and RY1H, and to open normally-closed contacts RY1A, RY1C, RY1E, and RY1G. Relays RY5 and RY6 are actuated for a brief interval of time immediately after relay RY1 is deactuated. When relay RY5 is actuated, contact RY5B is closed and contact RY5A is opened. When relay RY6 is actuated, contacts RY6A and RY6C are closed, and contact RY6B is opened.

Figure 3:
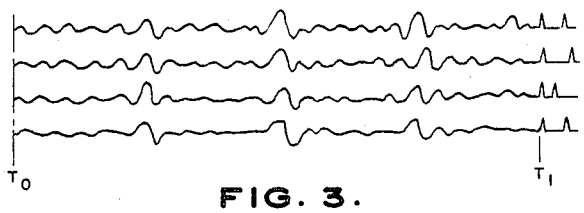
FIG. 3 is a simplified multitrace seismogram useful in understanding the invention.

The operation of the apparatus described above is as follows. Assume that the data trace reproducer 1 is actuated so as to reproduce a given seismic trace on the recording medium transported thereby over two complete reproduction cycles. On the first reproduction cycle, contact RY4A will be closed so that the rectified seismic wave signal from linear rectifier 38 is applied to integrator 49. Contact RY3A is initially closed at the very beginning of the first reproduction cycle so as to discharge the integrating capacitor 47 and set the integrating means to a reference level. Oscillator 67 is connected to amplifier 17 through contacts RY1E and RY1G so as to control the gain of the gain control loop 24 through potentiometer 11 driven by reproducer 1. Contact RY2A is momentarily closed so that potentiometer tap 61 is set at a zero or reference level. During the first reproduction cycle, the output signal from integrator 49 will progressively increase in accordance with the absolute amplitude of the seismic signal reproduced by head 1A over the first reproduction cycle. At the end of the first reproduction cycle, contact RY4A is opened and contact RY2A is momentarily closed. Immediately, the servo mechanism or meter potentiometer 59 will adjust the position of potentiometer tap 61 until the D.C. signals applied to the two input circuits of difference amplifier 51 are equal. Immediately after contact RY2A is again opened, contact RY1A is closed and remains closed for substantially the duration of the second reproduction cycle of reproducer 1. During this second reproduction cycle, relay RY5 is closed so that the output signal of the gain control loop 24 and the notch filter 34 is applied to the recording head 3A. During the second reproduction cycle, the gain of the gain control loop is controlled by the position of the tap 61 on potentiometer 63 inasmuch as the output signal from oscillator 67 is applied to amplifier 17 through contacts RY1F, RY1D, potentiometer 63, amplifier 64, and contacts RY1B, and RY1H. Thus, the absolute amplitude of the seismic signal determines the gain of the variable gain amplifier. When relay RY1 is deactuated, relays RY5 and RY6 are closed. At the moment that the two relays are closed, recording head 3A will receive a pulse as the result of capacitor 41 charging, which pulses are indicated in FIG. 3 at time $T_1$. The pulses thus produced will appear at the same location on the time axis of each of the traces processed by the apparatus. Integrating capacitor 43 will immediately begin integrating the voltage of battery 46 inasmuch as contact RY6C is closed, to couple the output voltage of battery 46 to amplifier 43, and contact RY6B is opened to remove the short circuit across capacitor 45. When the output voltage of amplifier 43 is of a predetermined differential voltage with respect to the output voltage of integrating amplifier 49 (for example, when the voltages are of the same magnitude), the circuit means 39 will be triggered to produce a pulse in the output circuit thereof which will be recorded by recording head 3A. The time interval between the pulse at time $T_1$ and the pulse produced by circuit means 39 are indicative of the output voltage of amplifier 49, and thus of the position of tap 61 on potentiometer 63. Inasmuch as the position of this tap is also indicative of the extent to which the trace reproduced by reproducer 1 and re-recorded by recorder 3 has been normalized in the gain control loop, the time interval between the aforementioned pulses will also be indicative of the normalization effected by the gain control loop. At the end of the second complete revolution of the reproducer 1 and recorder 3, relays RY5 and RY6 are deactuated so that integrating capacitor 45 is again short circuited to restore the output voltage of amplifier 43 to its reference level, and circuit means 39 is returned to its original condition. The output circuit of amplifier 37 is again connected to recording head 3A. The reproducing heads 1A and 3A may then be moved to process the other traces on the reproducible seismogram. When all of the traces of the seismogram have been processed, it will be found that the variables introduced into the originally recorded seismogram by the shotpoint parameters affecting amplitudes, and the detecting parameters, will be virtually eliminated on the seismogram recorded by recorder 3. The position of the pulses produced by circuit means 39 will form a gain calibration curve across the section for the gain control loop 24.

It should be noted that the potentiometer 11 may be eliminated, if such is desired. The reason that the potentiometer is included is that on occasion the original recording of a seismogram is performed with apparatus including a variable gain amplifier, the gain of which is varied to compensate for the decay in amplitude of energy detected by geophones after the production of a seismic impulse. The potentiometer 11 operates as a function generator to produce an output signal which is an inverse function of the desired gain function used to control the seismic signal during the original seismic recordation. Thus, the output signal from notch filter 34 will be a corrected time variant gain function appropriate to the area of recording interest.

The invention is not necessarily to be restricted to the specific structural details, arrangement of parts, or circuit connections herein set forth, as various modifications thereof may be effected without departing from the spirit and scope of the invention.

What is claimed is:

1. Apparatus for normalizing a reproducible data trace of a seismogram comprising:

means for reproducing the data trace through two successive reproduction cycles as an electrical signal;
   means for recording an electrical signal as a data trace;
   a signal channel for coupling the reproduced electrical signal from the reproducing means to the recording means for recordation thereby, including variable gain amplifier means;
   means including first integrating circuit means for integrating the absolute amplitude of the output signal of the variable gain amplifier means, with the variable gain amplifier means set at a fixed gain during the first reproduction cycle of said reproducing means to produce a gain control signal;
   means for setting the gain of the variable gain amplifier means during the second reproduction cycle of said reproducing means in accordance with the value of the gain control signal at the end of the first reproduction cycle;
   first circuit means having first and second input circuits and an output circuit, adapted to produce an output signal in said output circuit when the differential amplitude of the input signals to said input circuits is of predetermined magnitude;
   means connecting the output of said first integrating means to said first input circuit;
   second integrating circuit means, said second input circuit being connected to the output of said second integrating circuit means;
   a reference voltage source; and
   second circuit means connected to said reproducing means and to said recording means to connect said reference voltage source to said second integrating circuit means at the end of said second reproduction cycle, and to produce an electrical pulse for recordation by said recording means, said output circuit of said first circuit means being connected to said recording means for recordation of the output pulses thereof.

2. Apparatus for normalizing a reproducible data trace of a seismogram comprising:

means for reproducing the data trace through two successive reproduction cycles as an electrical signal;
   means for recording an electrical signal as a data trace;
   a signal channel for coupling the reproduced electrical signal from the reproducing means to the recording means for recordation thereby, including variable gain amplifier means;
   means including first integrating circuit means for integrating the absolute amplitude of the output signal of the variable gain amplifier means, with the variable gain amplifier means set at a fixed gain during the first reproduction cycle of said reproducing means to produce a gain control signal;
   means for setting the gain of the variable gain amplifier means during the second reproduction cycle of said reproducing means in accordance with the value of the gain control signal at the end of the first reproduction cycle;
   first circuit means having first and second input circuits and an output circuit, adapted to produce an output signal in said output circuit when the differential amplitude of the input signals to said input circuits is of predetermined magnitude;
   means connecting the output of said first integrating means to said first input circuit;
   second integrating circuit means, said second input circuit being connected to the output of said second integrating circuit means;
   a reference voltage source;
   second circuit means connected to said reproducing means to connect said reference voltage source to said second integrating circuit means at the end of said second reproduction cycle and to produce an electrical pulse thereupon; and
   third circuit means connected to said recording means and to said first and second circuit means for transmitting pulses produced by said second circuit means and by said first circuit means to said recording means for recordation thereby.

3. Apparatus for normalizing a reproducible data trace of a seismogram comprising:

means for reproducing the data trace through two successive reproduction cycles as an electrical signal;
   means for recording an electrical signal as a data trace;
   a signal channel for coupling the reproduced electrical signal from the reproducing means to the recording means for recordation thereby, including variable gain amplifier means;

means including first integrating circuit means for integrating the output signal of the variable gain amplifier means, with the variable gain amplifier means set at a fixed gain during the first reproduction cycle of said reproducing means to produce a gain control signal;

means for setting the gain of the variable gain amplifier means during the second reproduction cycle of said reproducing means in accordance with the value of the gain control signal at the end of the first reproduction cycle;

first circuit means having first and second input circuits and an output pulse when the signals fed to said first and second input circuits are of predetermined differential amplitude;

second circuit means connected to said second input circuit and to said reproducing means for producing a reference pulse at the end of said second reproduction cycle, and for producing a signal of constantly increasing amplitude in said second input circuit for a predetermined time interval; and means connected to said first circuit means and to said second circuit means for coupling said reference pulse and the output pulse of said first circuit means to said recording means for recordation thereof as extensions of the data trace immediately previously recorded by said recording means.

4. The apparatus of claim 3 wherein the first circuit means comprises a bistable multivibrator.

References Cited by the Examiner
UNITED STATES PATENTS

| 2,835,746 | 5/1958 | Montgomery | 340—15.5 |
| 3,185,930 | 5/1965 | Crawford et al. | 340—15.5 |
| 3,188,575 | 6/1965 | Sheffet | 340—15.5 |
| 3,239,802 | 3/1966 | Sheffet | 340—15.5 |

BENJAMIN A. BORCHELT, *Primary Examiner.*

R. M. SKOLNIK, *Assistant Examiner.*